United States Patent [19]

Schröder et al.

[11] Patent Number: 5,594,184

[45] Date of Patent: Jan. 14, 1997

[54] METHOD OF AND APPARATUS FOR DETERMINING THE WEIGHT OF ROD-SHAPED ARTICLES OF THE TOBACCO PROCESSING INDUSTRY

[75] Inventors: Dierk Schröder, Hamburg; Dirk Sacher, Wentorf; Peter Straube, Hamburg, all of Germany

[73] Assignee: Hauni Maschinenbau AG, Hamburg, Germany

[21] Appl. No.: 498,641

[22] Filed: Jul. 6, 1995

[30] Foreign Application Priority Data

Aug. 4, 1994 [DE] Germany ............. 44 27 605.2

[51] Int. Cl.⁶ .................................................. G01G 13/00
[52] U.S. Cl. ..................................... 73/865; 177/54
[58] Field of Search .......................... 73/865, 865.8; 177/161, 199, 211, 54; 131/DIG. 910, DIG. 908; 209/520, 535, 593, 594

[56] References Cited

U.S. PATENT DOCUMENTS 3,715,056  2/1973  Preston ..................... 209/535
3,805,904  4/1974  Zimmerer .
5,135,113  8/1992  Mayer ....................... 209/539
5,141,001  8/1992  Heitmann ................... 131/908

FOREIGN PATENT DOCUMENTS

4211760  8/1993  Germany .
2060870  5/1981  United Kingdom .

Primary Examiner—Robert Raevis
Attorney, Agent, or Firm—Darby & Darby, P.C.

[57] ABSTRACT

Successive rod-shaped articles of the tobacco processing industry are conveyed transversely of their length along an arcuate path while advancing through a testing station wherein they are urged to impinge upon one or more sensors under the action of centrifugal force. The sensor or sensors transmit corresponding signals to one or more transducers which, in turn transmit signals to a processor wherein the signals are converted into signals denoting the actual weight of the tested articles. The apparatus can utilize piezoelectric transducers or other types of transducers, e.g., one or more extensometers.

28 Claims, 3 Drawing Sheets

METHOD OF AND APPARATUS FOR DETERMINING THE WEIGHT OF ROD-SHAPED ARTICLES OF THE TOBACCO PROCESSING INDUSTRY

BACKGROUND OF THE INVENTION

The invention relates to a method of and to an apparatus for determining or ascertaining the mass or weight of rod-shaped articles of the tobacco processing industry, particularly of wrapped sections of rod-like tobacco fillers of predetermined (unit or multiple unit) length.

The weight or mass (hereinafter referred to as weight) of cigarettes, cigarillos or other rod-shaped articles of the tobacco industry is being ascertained in a number of ways. The presently most popular procedure involves the measurement of density with beta rays. Thus, a wrapped rod-like tobacco filler is caused to advance along a predetermined path and across one or more beams of beta radiation. The intensity of radiation which has penetrated across the moving wrapped filler is determined and the thus obtained signals are indicative of the density of the respective increments of the monitored filler. These signals can be processed to denote the weight of discrete rod-shaped articles which are obtained by causing the filler to advance through a so-called cutoff or another severing device downstream of the density monitoring station. The just outlined procedure can be resorted to in order to ascertain the weight of rod-shaped articles of unit length or multiple unit length. Such procedure can furnish reasonably acceptable (accurate) results up to a certain limit. Thus, as the rate of monitoring increases above a predetermined value and the intensity of radiation remains unchanged, the accuracy of measurement deteriorates considerably. Moreover, the utilization of radioactive material for the determination of density contributes to the cost and complexity of the entire production line in order to ensure absolute safety for the attendants. In fact, many makers of rod-shaped articles of the tobacco processing industry, and even the ultimate consumers, are reluctant to utilize equipment or to buy products the density (and thereupon the weight) of which was determined by resorting to beta rays.

Another known proposal involves the utilization of optical radiation in the infrared range of the spectrum of electromagnetic waves. This eliminates the problems involving the safety of the testing equipment but creates other serious problems, particularly how to eliminate or how to compensate for the undesirable influence of certain characteristics of the contents of rod-shaped articles of the tobacco processing industry upon the intensity of optical radiation which is caused to impinge upon successive increments of a rapidly advancing rod and issues from the rod to be utilized as an indicator of the density of corresponding increments of the rod. Therefore, such optical measurements failed to gain widespread acceptance in the industry because the elimination of or compensation for all of the undesirable influences contributes significantly to the initial and maintenance cost of such equipment.

Still another known proposal involves actual weighing of batches of rod-shaped articles which are withdrawn from their path in a production line. The withdrawn articles can be weighed individually or in groups of two or more. This mode of weight determination is highly satisfactory as concerns the actually weighed articles but is not acceptable in many instances, e.g., when it is desirable or necessary to ascertain the weight of each and every rod-shaped article in a machine which turns out such articles at an extremely high rate.

OBJECTS OF THE INVENTION

An object of the invention is to provide a novel and improved method which renders it possible to determine the weight of each and every rod-shaped article of the, tobacco processing industry with a highly satisfactory degree of accuracy and at a frequency which is required in a modern high-speed cigarette making other machine for the mass production of rod-shaped articles of the tobacco processing industry.

another object of the invention is to provide a simple method which can be practiced in a small area and does not affect the appearance and/or other desirable characteristics of the weighed products.

A further object of the invention is to provide a method which can be practiced without resorting to any kinds of radiation.

An additional object of the invention is to provide a method which does not and need not rely upon the permeability or lack of permeability of tested products.

Still another object of the invention is to provide a novel and improved apparatus for the practice of the above outlined method.

A further object of the invention is to provide a simple, compact and relatively inexpensive apparatus which can be installed in existing production lines as a superior substitute for heretofore used apparatus.

Another object of the invention is to provide an apparatus which does not affect the appearance and/or other desirable characteristics of tested products and which can test rod-shaped articles at a frequency as required to determine tile weight of each and every article in a modern high-speed production line.

An additional object of the invention is to provide novel and improved means for converting first types of signals into signals actally denoting the weight of the respective rod-shaped articles.

Still another object of the invention is to provide a novel and improved conveyor system for the transport of rod-shaped articles during testing.

SUMMARY OF THE INVENTION

One feature of the present invention resides in the provision of a method of determining the weight of rod-shaped articles of the tobacco processing industry. Such articles can constitute wrapped sections of rod-shaped tobacco fillers having a predetermined (unit or multiple unit) length. The method comprises the steps of conveying successive articles of a series of articles along an arcuate path through a testing station wherein the articles are acted upon by centrifugal force of a magnitude which is indicative of the weight of the respective articles, generating first signals which denote the magnitude of centrifugal force acting upon the articles being conveyed through the testing station, and converting the first signals into second signals denoting the weight of the respective articles.

The articles can be elongated and the path can include a substantially circular portion which extends through the testing station. The conveying step then preferably includes advancing the articles at least substantially transversely of their length, at least along the at least substantially circular portion of the path.

The method can further comprise the steps of monitoring the speed at which successive articles of the series are being conveyed through the testing station, and generating third signals which denote the monitored speed of articles at the testing station. The converting step of such method preferably includes processing the first signals jointly with the respective third signals.

The conveying step can comprise introducing the articles of the series into peripheral flutes of a conveyor which is rotatable about an axis at least substantially parallel to the flutes and rotating the conveyor in a predetermined direction to thus advance successive flutes along the path toward, through and beyond the testing station. Such conveying step preferably further comprises pneumatically holding the articles in the respective flutes during advancement toward the testing station, and the step of generating first signals can comprise interrupting the pneumatic hold upon the articles not later than at the testing station so that the articles are free to move relative to their respective flutes under the action of centrifugal force and to act upon at least one sensor which initiates the generation of the first signals. The step of pneumatically holding can include attracting the articles into the respective flutes by suction. The conveying step of such method can also comprise pneumatically holding the articles in their respective flutes (e.g., by suction) during advancement of articles beyond the testing station.

Another feature of the invention resides in the provision of an apparatus for determining the weight of rod-shaped articles of the tobacco processing industry. Again, such articles can constitute wrapped sections of rod-like tobacco fillers having a predetermined (unit or multiple unit) length. The improved apparatus comprises means for conveying successive articles of a series of articles through a testing station along a predetermined path having at the testing station an arcuate portion so that successive articles being conveyed along the arcuate portion are acted upon by centrifugal force of a magnitude which is indicative of the the weight of the respective articles, means for generating first signals which denote the magnitude of centrifugal force acting upon the articles at the testing station, and means for processing the first signals into second signals denoting the weight of the respective articles.

The means for conveying can comprise a conveyor (e.g., a drum-shaped conveyor) which can turn about a predetermined axis and has a peripheral surface provided with flutes which receive the articles to be weighed and advance the thus received articles along the path in a predetermined direction so that successive articles of the series are advanced in the respective flutes toward, through and beyond the testing station. The conveyor can further comprise means for pneumatically holding articles in the respective flutes during advancement of the articles toward and beyond the testing station. The means for pneumatically holding can include means for attracting the articles in the respective flutes by suction except during advancement of the articles through the testing station.

The arcuate portion of the path can form part of a circular path having a first radius of curvature, and the apparatus can further comprise at least one sensor having a surface which confronts successive articles being conveyed through the testing station and has a second radius of curvature which at least approximates the first radius The means for generating first signals can comprise at least one transducer which cooperates with the at least one sensor to generate first signals having at least one parameter which is indicative of the magnitude of centrifugal force acting upon the surface of the at least one sensor. The processing means is provided with at least one input for signals from the at least one transducer. The at least one sensor can form part of the means for generating first signals. The just described embodiment of the apparatus can further comprise means for transmitting forces—corresponding to the centrifugal force acting upon the surface of the at least one sensor—from the at least one sensor to the at least one transducer. Such means for transmitting forces can include at least one beam which is flexible by the at least one sensor and a plunger or other suitable pressure transmitting means between the at least one beam and the at least one transducer. Alternatively, the means for transmitting forces can include at least one lever which is pivotable by the at least one sensor, and pressure transmitting means between the at least one lever and the at least one transducer. Such pivotable lever and/or flexible beam can be used to transmit forces to one or more piezoelectric transducers or to one or more transducers which constitute or employ extensometers.

The distance between neighboring flutes of the rotary conveyor (as seen in the direction of advancement or articles along the path toward, through and beyond the testing station), and the length of the at least one sensor is such direction is or can be less than the aforementioned distance.

As a rule, the diameters of articles forming the series of articles being weighed match or at least closely approximate a predetermined diameter. The apparatus can comprise at least two sensors which are spaced apart from each other in the longitudinal direction of the articles being conveyed through the testing station and each such sensor can comprise a rail or an analogous member extending along the peripheral surface of the conveyor forming part of the means for conveying the articles along their path. Such rails extend in the direction of advancement of articles toward, through and beyond the testing station and the deepmost portions of the flutes for articles in the peripheral surface of the rotary conveyor are spaced apart from the confronting surfaces of the plural sensors a distance greater than the predetermined diameter during advancement of the flutes through the testing station. The means for generating first signals can comprise a discrete transducer for each of the at least two sensors, and the processing means is then preferably provided with plural inputs for signals from the discrete transducers. The processing means is operative to process first signals which are simultaneously received from the discrete transducers into second signals denoting the weight of the respective articles which were in simultaneous contact with the surfaces of the at least two sensors.

The path for successive articles of the series is preferably configured to include a second portion upstream and a third portion downstream of the arcuate portion extending through the testing station, as seen in the direction of advancement of articles by the conveying means along such path. The apparatus can further comprise at least one guide which cooperates with the conveying means to define the second portion of the path. The deep most portions of flutes advancing along the second portion of the path are spaced apart from the at least one guide a distance at least matching the predetermined diameter of the articles being weighed, and the articles advancing with such flutes along the second portion of the path are preferably held in their flutes by pneumatic means during their advancement along the second portion but short of the arcuate portion of the path, i.e., short of the testing station. The at least one guide can comprise, a plurality of guide rails.

At least one second guide can be provided adjacent the third portion of the path downstream of the testing station. The third guide can also comprise two or more guide rails which define the third portion of the path jointly with the conveying means. The deep most portions of the flutes advancing along the third portion of the path are spaced apart from the at least one second guide a distance which at least matches the predetermined diameter while the flutes advance the articles along the third portion of the path, and the aforementioned means for pneumatically holding the articles in their flutes is preferably effective as soon as the articles leave the testing station, i.e., when they enter the third portion of the path.

The apparatus can further comprise means for monitoring the speed at which successive articles of the series are being conveyed through the testing station and for generating third signals which denote the monitored speed of articles at the testing station. The processing means is then provided with one or more inputs for third signals, and such processing means is operative to generate the second signals as a function of the respective first and third signals.

As already mentioned hereinbefore, the means for generating first signals can comprise a plurality of sensors which are acted upon by successive articles of the series during conveying of the articles through the testing station, and such apparatus can comprise a discrete transducer for each sensor or a single transducer common to all sensors and serving to transmit first signals (with or without amplification) from the plurality of sensors to the processing means.

The arcuate portion of the path at the testing station can have a first radius of curvature and the surface(s) of the sensor or sensors forming part of or cooperating with the means for generating first signals can have a second radius of curvature which is smaller than the first radius of curvature.

The novel features which are considered as characteristic of the invention are set forth in particular in the appended claims. The improved weighing apparatus itself, however, both as to its construction and its mode of operation, together with additional features and advantages theeof, will be best understood upon perusal of the following detailed description of certain presently preferred specific embodiments with reference to the accompanying drawings.

DESCRIPTION OF PREFERRED EMBODIMENTS

Figure 1:
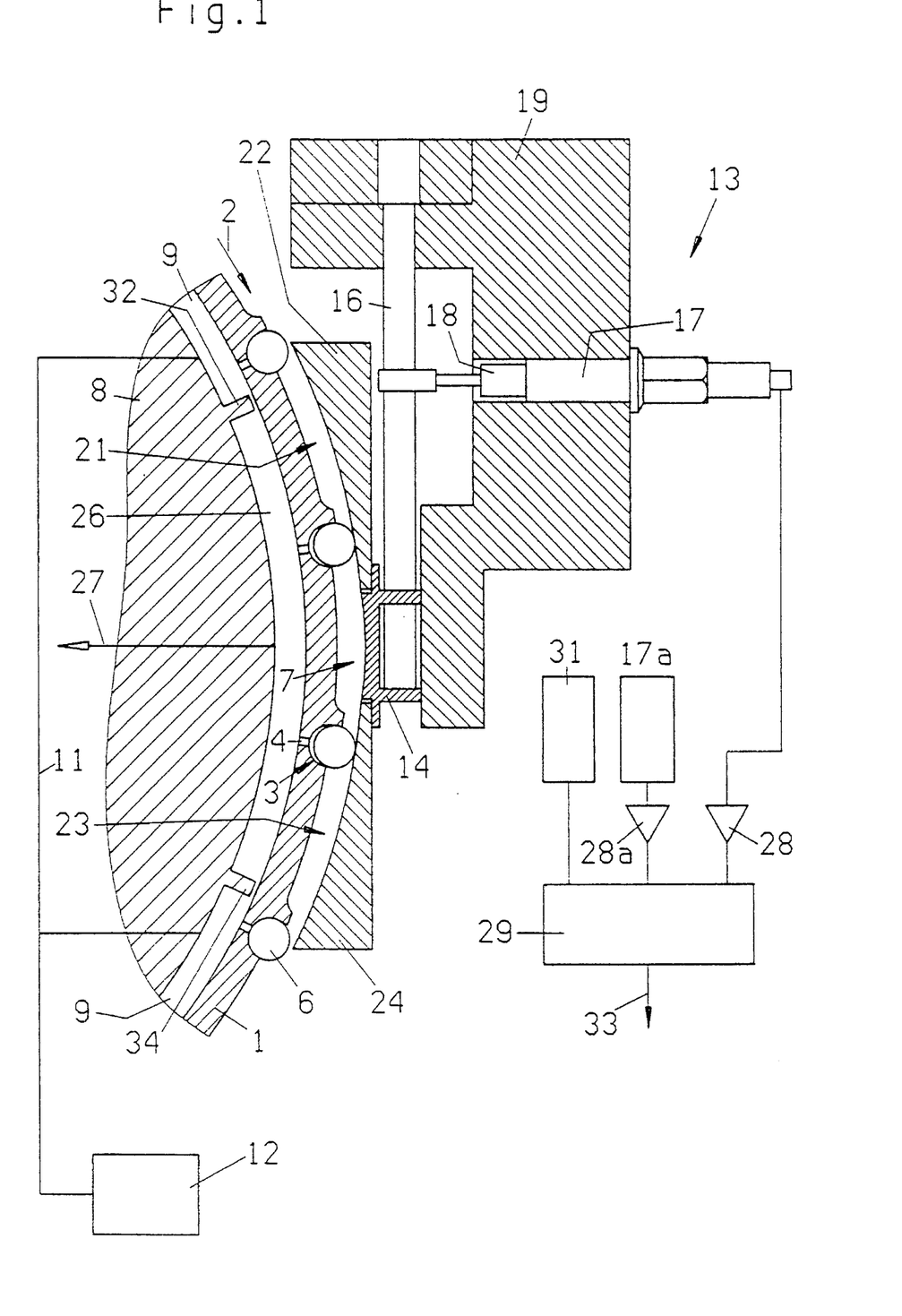
FIG. 1 is a fragmentary partly sectional and partly diagrammatic view of an apparatus which embodies one form of the invention.

FIG. 1 shows a portion of an apparatus which is designed to weigh successive rod-shaped articles 6 (hereinafter called cigarettes for short) during transport through a testing station 7. The means for conveying successive cigarettes 6 of the series along a predetermined path in the direction of arrow 2 comprises a rotary drum-shaped conveyor 1 having a peripheral surface provided with equidistant receptacles in the form of flutes 3 which are at least substantially parallel to the axis of rotation of the conveyor 1 and advance the cigarettes 6 sideways, i.e., transversely of the longitudinal directions of the cigarettes.

Each cigarette 6 can constitute an article of unit length or multiple unit length. Such cigarettes are pneumatically held in the respective flutes 3 during advancement toward and during advancement beyond the testing station 7 but not at the testing station. This can be readily seen in FIG. 1 wherein the topmost cigarette 6 is fuly received in its flute 3, the next lower cigarette is spaced apart from the deepmost portion of the respective flute, the next lower cigarette is also spaced apart from the deep most portion of its flute 3, and the lowermost cigarette is fully received in its respective flute.

The conveyor 1 is a hollow drum which can rotate about a stationary core 8. The means for pneumatically holding the cigarettes 6 in their flutes 3 during movement along their path toward and thereupon beyond the testing station 7 comprises suction ports 4 which connect the flutes 3 with a suction chamber 9 between the conveyor 1 and the core 8, a suction generating device 12, and channels and/or bores 11 connecting the inlet of the device 12 with the chamber 9.

The illustrated path for the cigarettes 6 is an arcuate path having its center of curvature on the axis of the rotary conveyor 1 and including a first or median portion at the testing station 7, a second or upstream portion 21 ahead of the testing station, and a third or downstream portion 23 behind the testing station, all as seen in the direction of arrow 2. The core 8 comprises two circumferentially spaced apart radially outwardly extending projections 32 and 34 in the form of ribs which extend across the suction chamber 9 toward but short of the internal surface of the hollow conveyor 1. That portion (shown at 26) of the suction chamber 9 which is disposed between the projections 32 and 34 is free to communicate with the atmosphere (as indicated by the arrow 27) to thus interrupt the pneumatic hold upon the cigarettes 6 in those flutes 3 which advance in the downstream part of the second path portion 21, through the testing station 7 and in the upstream part of the path portion 23. Therefore, the cigarettes 6 advancing through the testing station 7 can be acted upon by centrifugal force (in a direction to the right, as viewed in FIG. 1) and to exert pressure upon at least one sensor 14 which forms part of or cooperates with a signal generating unit 13. The latter transmits (first) signals to the corresponding input of a signal processing unit 29 which processes the first signals (denoting the magnitude of centrifugal force acting upon the sensor 14) into second signals denoting the actual weight of the respective tested cigarettes 6. Such second signals can be transmitted to a display (not specifically shown) or to another destination by way of an output 31 of the processing unit 29.

Figure 3:
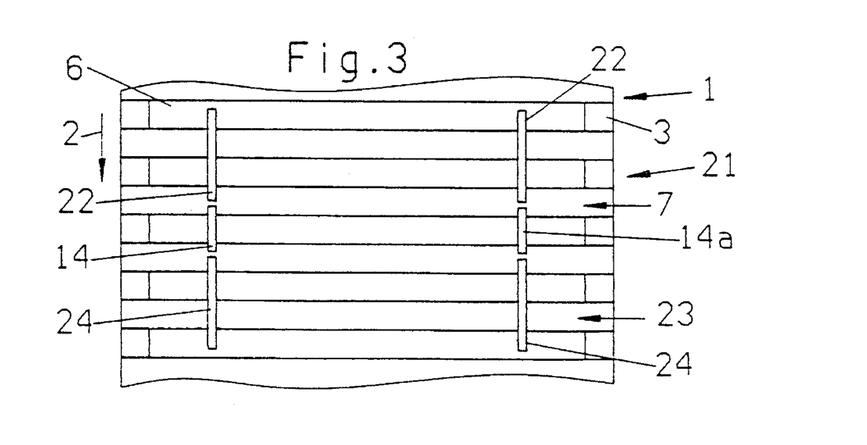
FIG. 3 is a fragmentary smaller-scale developed view of a portion of the means for conveying rod-shaped articles in the testing apparatus and of certain other components of such apparatus.

As can be seen in FIG. 3, the weighing apparatus of FIG. 1 comprises or can comprise two sensors 14, 14a in the form of relatively narrow rails which are spaced apart from each other in the longitudinal direction of the flutes 3 advancing through the testing station 7 and each of which is affixed to a flexible beam 16 forming part of means for transmitting forces from the sensors 14 to discrete piezoelectric transducers 17, 17a. The force transmitting means further comprises a pusher or plunger 18 which receives motion from the respective beam 16 and acts upon the corresponding transducer 17. The signals from the transducers 17, 17a to the corresponding inputs of the processing unit 29 are or can be amplified (FIG. 1 shows an amplifier 28, 28a for each of the transducers 17, 17a).

If desired or necessary, the apparatus of FIG. 1 can employ more than two sensors. For example, and referring to FIG. 3, at least one further sensor can be installed between the sensors 14, 14a to cooperate with a further flexible beam corresponding to the beam 16 of FIG. 1. By increasing the number of sensors at the testing station 7, one can prevent the articles 6 from vibrating during contact with plural sensors (or the ability of the articles to vibrate is minimized) which is beneficial to the quality of the testing operation.

The beam 16 and the transducer 17 of FIG. 1 are installed in a stationary housing 19 which is affixed to or forms part of the machine frame.

In FIG. 1, the right-hand side of the sensor 14 appears to abut the adjacent portion of the housing 19. Actually, there is a narrow clearance which suffices to ensure that the sensor 14 can be displaced by a cigarette 6 advancing through the testing station 7 (and being acted upon by centrifugal force) so that the extent of flexing of the beam 16 land hence the magnitude of force being applied to the piezoelectric transducer 17 by the pusher or plunger 18 of the force transmitting means in the signal generating unit 13) is indicative of the magnitude of centrifugal force acting upon the cigarette 6 which happens to bear against the sensor 14. The aforementioned clearance can have a width in the range of between a few nanometers and 0.1 millimeter. Pronounced displacements of the sensor or sensors under the action of cigarettes 6 advancing through the testing station 7 are not considered necessary (or even desirable) because this would establish steps or shoulders between the sensors (such as the sensor 14 shown in FIG. 1) and the adjacent portions of fixed guides 22, 24 which are respectively located upstream and downstream of the testing station 7. Such steps or shoulders could affect the appearance and/or integrity of the tested articles and could also affect the accuracy of measurement of the magnitude of centrifugal force acting upon successive cigarettes 6 of the series of cigarettes advancing through the testing station 7.

The utilization of two or more sensors (such as the sensors 14, 14a shown in FIG. 3) brings about the advantage that the mass of the force transmitting means 16, 18 forming part of the signal generating unit 13 can be reduced to a minimum. In accordance with a modification which is not shown in the drawings, the plural transducers (such as the piezoelectric transducers 17, 17a shown in FIG. 1) can be replaced by a single transducer which is acted upon by two or more pushers or plungers 18, one for each of the sensors.

The apparatus of FIG. 1 can employ two or more identical sensors (such as the sensors 14, 14a shown in FIG. 3) as well as identical sets of flexible beams 16, pushers or plungers 18 and transducers (17, 17a). This simplifies the assembly and maintenance and contributes to a lower initial cost of the signal generating unit 13. As already mentioned above, the sensors 14, 14a can constitute relatively narrow and relatively short rails which extend in the direction of the arrow 2 and have concave surfaces confronting the cigarettes 6 advancing through the testing station. The distance between the concave surface of each sensor and the deep most portion of the flute 3 advancing through the testing station exceeds the diameter of a cigarette 6; this ensures that the force with which a cigarette bears against the concave surface(s) of the sensor or sensors at the testing station is determined exclusively or practically exclusively by centrifugal force acting upon such cigarette. The radius of curvature of the concave surface of each sensor can be smaller than the radius of curvature of the peripheral surface of the rotary conveyor 1, i.e., the concave surface of each sensor is more distant from the peripheral surface of the conveyor 1 than the concave surfaces of the guides 22 and 24. This ensures that the cigarettes 6 advancing through the testing station 7 can be acted upon by larger centrifugal forces and the signals which the transducers 17, 17a transmit to the corresponding inputs of the processing unit 29 can be processed into second signals which more accurately denote the weight of the respective cigarettes 6. However, it is equally within the purview of the invention to provide each sensor with a concave surface having the same radius of curvature as the peripheral surface of the conveyor 1.

As can be seen in. FIG. 3, each guide 22 can comprise two relatively narrow rails which extend in the direction of the arrow 2 and are spaced apart from each other in the longitudinal direction of the flutes 3 advancing through the second portion 21 of the arcuate path. The distance of the concave left-hand sides or surfaces (as viewed in FIG. 1) of the rails forming part of the guide 22 from the deepmost portions of the flutes 3 advancing through the portion 21 of the path for the cigarettes toward, through and beyond the testing station at least matches the diameter of a cigarette 7. The transition from the concave surfaces of the rails forming part of the guide 22 into the concave surfaces of the sensors 14, 14a at the testing station 7 is preferably smooth (i.e., devoid of shoulders or steps) for reasons which were explained hereinbefore.

A second guide 24 (which can also comprise two relatively narrow rails (shown in FIG. 3) extending in the direction of arrow 2 radially outwardly of the path portion 23 is or can be a mirror image of the guide 22. The distance of the concave surfaces of the rails forming part of the guide 24 from the deepmost portions of the flutes 3 advancing through the path portion 23 at least matches the diameter of a cigarette 6.

As can be readily seen in FIG. 1, the length of the ventilated portion 26 of the chamber 9 between the concave inner side of the conveyor 1 and the core 8 exceeds the length of the testing station 7 (as seen in the direction of the arrow 2). This ensures that each cigarette 7 is invariably free to be acted upon by centrifugal force (i.e., to be urged against the concave surface(s) of the sensor(s) at the station 7) while still advancing along the downstream portion of the guide 22. Analogously a cigarette 7 which advances beyond the testing station 7 is not immediately attracted into its flute 3 but slides or rolls along the upstream portions of concave surfaces of the rails constituting or forming part of the guide 24.

FIG. 1 further shows a monitoring device 31 which serves to ascertain the speed of advancement of successive cigarettes 6 through the testing station 7 and to generate third signals which are transmitted to the corresponding input of the processing unit 29. The latter processes the first signals (from the amplifiers 28, 28a) together with the corresponding third signals from the monitoring device 31 to thus further enhance the accuracy of signals at the output 33, i.e., of signals which denote the weight of the cigarettes 6. Such second signals can be merely displayed for inspection by the attendants or they can be used to initiate a correction if the actual weight of tested or weighed cigarettes 6 departs from a desired or optimum weight.

When the testing or weighing apparatus of FIG. 1 is in actual use, successive cigarettes 6 of the series to be tested are attracted to the surfaces of the respective flutes 3 during advancement toward the upstream projection or rib 32 as well as during advancement beyond the downstream rib 34 of the core 8. Such cigarettes are free to be acted upon by centrifugal force during advancement from the rib 32 toward the rib 34. Portions of the thus released cigarettes 6 remain in the respective flutes 3, i.e., the speed of the cigarettes in the direction of the arrow 2 remains unchanged while the cigarettes roll or slide first along the downstream portion of the guide 22, thereupon along the concave surface(s) of the sensor(s) and thereafter along the upstream portion of the guide 24. The intensity and/or another parameter of the signal issuing from each piezoelectric transducer reflects the magnitude of centrifugal force acting upon the respective cigarette 6 during advancement through the testing station 7, and such signals are amplified at 28, 28a and processed in the unit 29 jointly with the corresponding (third) signals from the speed monitoring device 31 to be converted into second signals denoting the actual weight of successively tested cigarettes.

If the speed of the conveyor 1 does not vary, the speed monitoring device 31 can be omitted or deactivated and the corresponding input of the processing unit 29 simply receives a constant signal which is indicative of the (constant) speed of the cigarettes 6 advancing through the testing station 7. However, it is normally preferred to measure the speed of successive cigarettes 6 during advancement through the testing station 7 because such speed is likely to change in actual use of the improved apparatus in a production line for the making of cigarettes or other rod-shaped articles of the tobacco processing industry.

The conversion of first and third signals into second signals appearing at the output 33 of the processing unit or circuit 29 can be carried out in accordance with the equation $$m = \frac{F \cdot R}{v^2}$$

wherein F is the measured magnitude of centrifugal force, R is the radius of curvature of the concave surface(s) of the sensor(s) at the testing station 7, v is the speed of articles 6 at the testing station, and m is the mass or weight of tested articles (as represented by the (second) signal at the output 33 of the processing unit 29). Certain undesirable influences upon the cigarettes advancing through the testing station 7, e.g., friction between the wrappers of the cigarettes and the concave surface(s) of the sensor(s), can be compensated for by resorting to empirically determined correction factors and/or by reducing such friction (as well as the friction between other parts of the signal generating unit 13) to a minimum. The thus obtained second signals (at the output 33) can be utilized with advantage to directly or indirectly influence the controls which select and/or correct the weight of cigarettes.

A freshly tested cigarette 6 which has advanced beyond the sensor 14 of FIG. 1 is free to slide or roll along the concave surfaces of the rails forming part of the guide 24 until it reaches the rib 34. At such time, the corresponding suction port 4 of the conveyor 1 begins to communicate with that portion of the suction chamber 9 wherein the pressure is below atmospheric pressure so that the tested cigarette is attracted to the surface bounding the respective flute 3 and is transported to the locus of expulsion from the flute, e.g., for transfer onto another rotary conveyor, onto a belt conveyor or elsewhere.

In the apparatus of FIG. 1, the conveyor 1 is driven in a clockwise direction as indicated by the arrow 2. However, its is equally possible to change the mode of operation of the apparatus by causing the conveyor 1 to rotate in a counterclockwise direction. This can result in the generation of even more reliable first signals (denoting the magnitude of centrifugal force acting upon successively tested cigarettes 6 at the station 7) because the influence of frictional forces upon the first signals is less pronounced.

Figure 2:
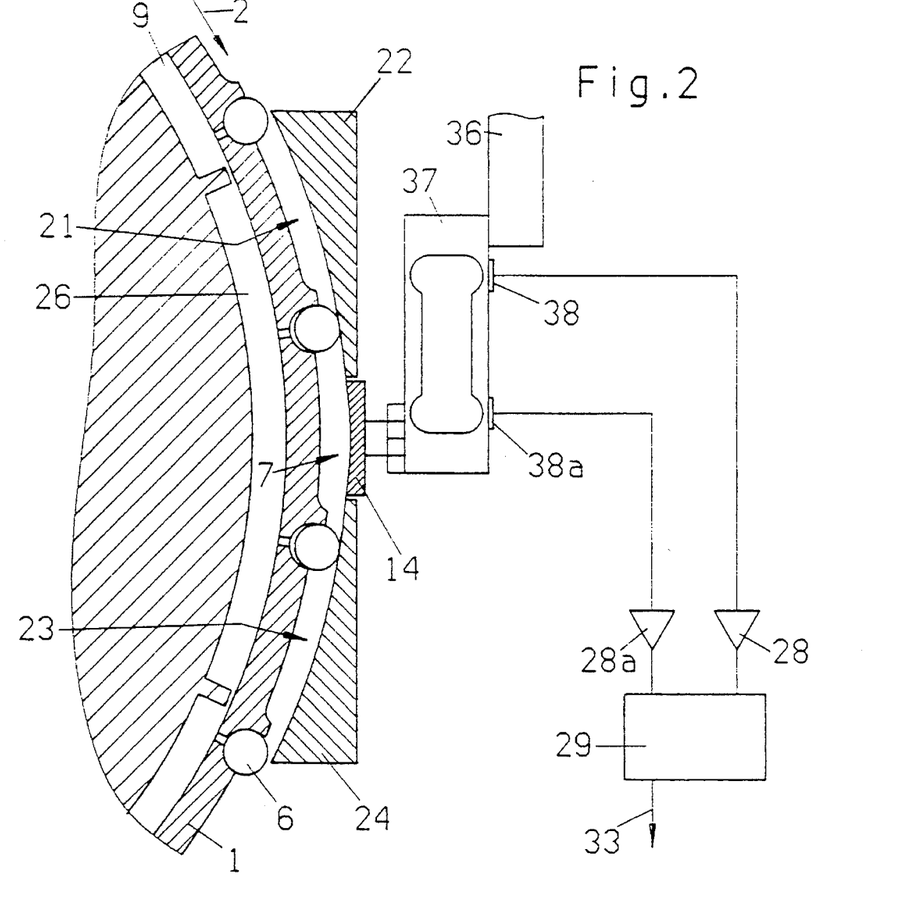
FIG. 2 is a similar fragmentary partly sectional and partly diagrammatic view of a second apparatus.

The left-hand part (including the conveyor 1 and the guides 22, 24) of the weighing apparatus of FIG. 2 is or can be identical with the corresponding part of the apparatus of FIG. 1. The same applies for the configuration of the path including the upstream portion 21, the portion at the testing station 7, and the downstream portion 23. The difference between the apparatus of FIGS. 1 and 2 resides in the construction of the means for generating first signals which are being transmitted to the amplifiers 28, 28a and thereupon to the processing unit or circuit 29 of FIG. 2. The machine frame 36 or another stationary part of the machine or production line in which the apparatus of FIG. 2 is put to use carries a flexible beam 37. One end portion of the beam 37 is affixed to the frame 36 and its other end portion carries the sensor 14. The beam 37 further carries two transducers in the form of extensometers (denoted by the characters 38 and 38a) which generate force signals corresponding to the magnitude of centrifugal force acting upon a cigarette 6 advancing past the sensor 14. Such force signals are amplified at 28 and 28a and constitute first signals which are processed in the unit 29 into second signals (transmitted by the output 33) which denote the actual weight of successively tested cigarettes 6.

The apparatus of FIG. 2 can also employ a composite guide 22 and/or a composite guide 24, for example, as shown in FIG. 3.

Figure 4:
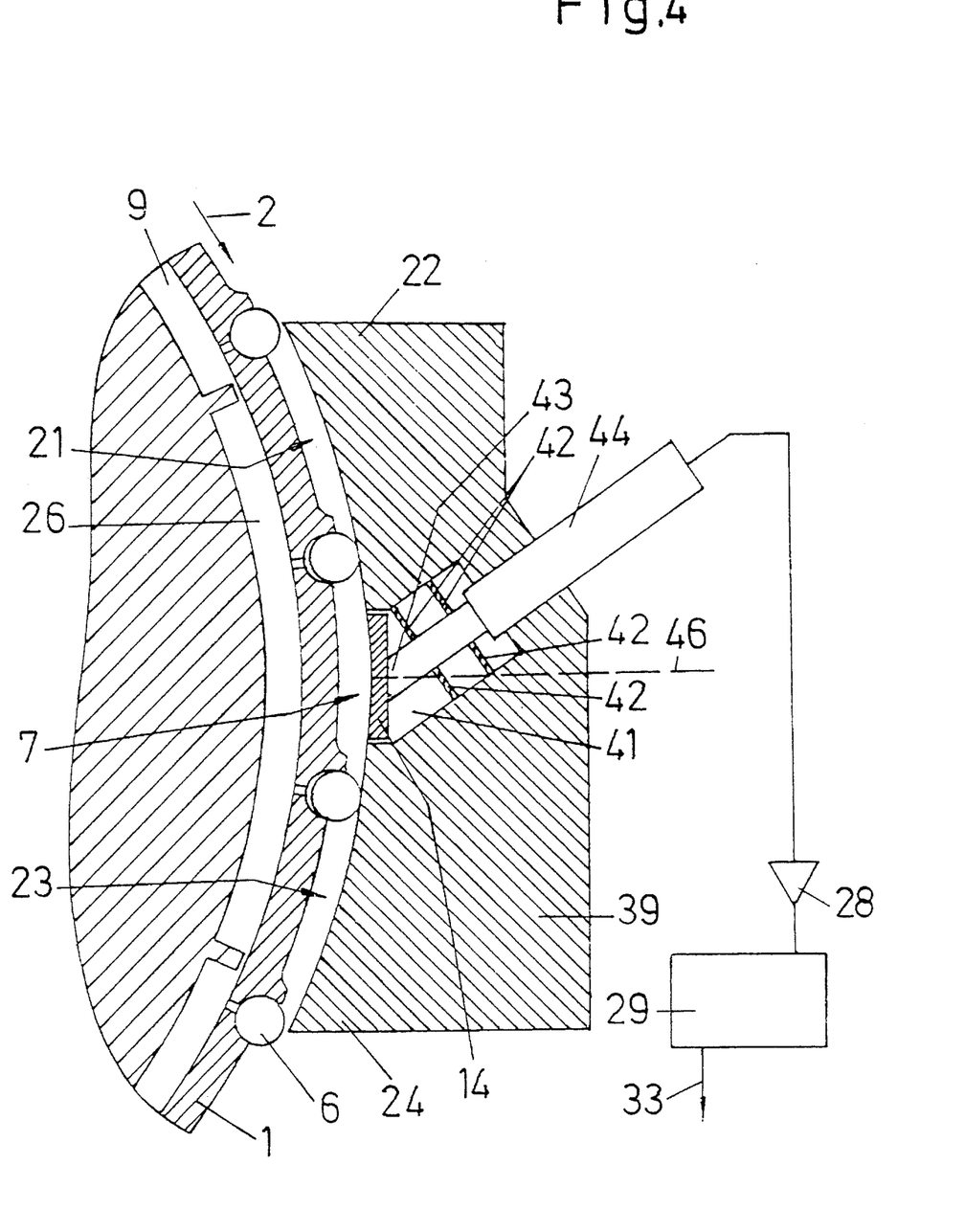
FIG. 4 is a fragmentary partly sectional and partly diagrammatic view of a further weighing or testing apparatus.

FIG. 4 illustrates a portion of a third weighing apparatus. All such parts of this third apparatus which are identical with or plainly equivalent to the corresponding parts of the apparatus of FIGS. 1 and 3 are denoted by similar reference characters. The guides 22, 24 in the apparatus of FIG. 4 form part of a substantially plate-like carrier 39 having a recess 41 for two spaced-apart parallel membranes 42 traversed by a stud 43 which carries a sensor 14 located at the testing station 7. The sensor 14 is located at one end of the stud 43, and the other end of this stud is used as a means for transmitting forces (corresponding to the magnitude of centrifugal forces acting upon the sensor 14) to a transducer 44, e.g., a piezoelectric transducer. The latter transmits (first) signals to an amplifier 28 which, in turn, transmits amplified first signals to the corresponding input of the processing unit or circuit 29. The latter converts first signals into second signals which are transmitted at the output 33 and denote the actual weight or mass of tested cigarettes 6. The membranes 42 can be said to constitute a yieldable bearing which permits the stud 43 to move only lengthwise. Thus, the membranes 42 also confine the sensor 14 to movements in the longitudinal direction of the stud 43 which is beneficial to the accuracy of the first signals because the sensor 14 cannot change its position in the direction of the arrow 2, e.g., under the action of frictional forces which develop during advancement of successive cigarettes 6 along the concave surface of the sensor 14. It has been found that such mounting of the sensor 14 can at least substantially (but even completely) eliminate the influence of undesirable forces upon the sensor 14 and hence the accuracy of signals which are being generated by the transducer 44. The transducer 44 is inclined relative to a plane 46 which includes the axis of the conveyor 1 and halves the concave surface of the sensor 14 at the testing station 7. The angle between the longitudinal axis of the transducer 44 of FIG. 4 and the plane 46 is approximately 30° but can be larger or smaller. Such inclination of the transducer 44 relative to the plane also contributes to the generation of more satisfactory first signals because the forces developing as a result of friction between the concave surface of the sensor 14 and the cigarettes 6 moving through the testing station 7 at least partially oppose (and hence compensate for) each other.

The improved apparatus can be used to individually determine the weight of each of a short or long series of successive cigarettes 6. For example, and referring again to FIG. 1, if the effective length of the concave surface of the sensor 14 shown in FIG. 1 is less than the distance between the centers of neighboring flutes 3 in the peripheral surface of the rotary conveyor 1 (all as measured in the direction of the arrow 2), the apparatus will ascertain the weight of each discrete cigarette 6 advancing through the testing station 7. The reason is that the intensity of signal transmitted by the sensor 14 to the transducer 17 is reduced to zero as soon as a cigarette 6 completes its advancement beyond the concave surface of such sensor. An advantage of apparatus employing short sensors is that the determination of the magnitude of centrifugal forces does not require the utilization of a system which carries out absolute measurements and this, in turn, contributes to lower cost of the weighing apparatus.

If the concave surface of a sensor 14 is so long that it can be simultaneously contacted by two or more successive cigarettes 6, the signal being transmitted to the transducer 17 is a signal denoting the centrifugal forces acting upon two or more successive cigarettes during advancement past the concave surface of such elongated sensor. Each such signal is thereupon processed to constitute a signal denoting the average weight of two or more successively weighed cigarettes.

If the length of the concave surface of the sensor 14 of FIG. 1 (or of any sensor in the apparatus of FIG. 1, 2 or 4) matches the distance between the centers of two neighboring flutes 3, the intensity of signals transmitted by the sensor 14 does not decrease to zero when the testing of a preceding cigarette 6 is completed and the testing of the next-following cigarette begins. Nevertheless, each signal is indicative of the centrifugal force acting upon a single cigarette. Under such circumstances, it is desirable to employ a system which is capable of carrying out absolute measurements.

The apparatus which are shown in FIGS. 1 and 2 employ force transmitting means which include flexible beams 16 and 37 as means for transmitting forces to the respective transducers (17, 17a and 38, 38a). On the other hand, FIG. 4 shows that the sensor 14 (which can be said to include the stud or pusher or plunger 43) can act directly upon a transducer (44). Thus, the sensor or sensors can but need not form part of the means for generating first signals.

The illustrated transducers (such as the piezoelectric transducers 17, 17 and 44 as well as the extensometers 38, 38a) are merely two examples of transducers which can be utilized in the means for generating first signals to indicate the magnitude of centrifugal forces acting upon the cigarettes 6 at the testing station 7. It is clear that certain other types of (e.g., capacitive or inductive) transducers can be utilized with equal or similar advantage.

An important advantage of the improved apparatus is that it can directly process the first signals (denoting the magnitude of centrifugal force) into second signals which denote the mass or weight of the tested articles. The centrifugal force acting upon an article advancing through the testing station 7 is directly dependent upon the mass or weight of the respective article. Therefore, the aforedescribed method and apparatus can be said to permit direct determination of the mass or weight of cigarettes or other rod-shaped articles of the tobacco processing industry. It has been found that the novel method and apparatus are just as reliable as the aforedescribed prior proposal to remove individual articles or batches of articles from a continuous or discontinuous flow and to weigh the removed articles, either individually or in groups of two or more. The novel method and apparatus exhibit the advantage that they render it possible to weigh each of a short or long series of articles individually or in groups of two or more (depending on the length of the concave surface(s) of the sensor(s) at the testing station. Moreover, it is not necessary to discard the tested articles and it is not necessary to return the tested articles into the path for other articles.

The feature that the path for the articles to be tested includes a part circular portion at the testing station 7 exhibits the advantage that this simplifies the mathematical relationship between the centrifugal force and the weight or mass of the articles.

As already explained hereinbefore, the utilization of the speed monitoring device 31 constitutes an optional but desirable and advantageous feature of the improved method and apparatus, especially when it is to be expected that the conveyor 1 or an analogous conveyor will be required to advance the articles at two or more different speeds.

The feature that the pneumatic hold upon the articles to be tested is interrupted at least slightly ahead of the testing station and is reestablished at least slightly downstream of the testing station is desirable and advantageous because this ensures that the centrifugal force acting upon an article advancing through the testing station is truly indicative of the weight of such article.

A rotary conveyor which constitutes or resembles a hollow drum and has a peripheral surface provided with suitably distributed flutes or analogous receptacles serving to advance the articles transversely of the length of such articles constitutes a presently preferred means for transporting articles toward, through and beyond the testing station.

The flexible beams (such as 16) can be replaced with pivotable levers without departing from the spirit of the invention. Another important advantage of the improved apparatus is that it need not employ nuclear and/or optical radiation. This contributes to the safety as well as to accuracy of the measurements because the magnitude of centrifugal force acting upon an article at the testing station is not affected by undesirable influences which can affect the accuracy of measurements with nuclear or optical radiation. Moreover, the weighing can be carried out in line irrespective of the speed of transport of the articles and the apparatus is relatively simple and inexpensive and requires little maintenance.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A method of determining the weight of rod-shaped articles of the tobacco processing industry, comprising the steps of conveying successive articles of a series of articles along an arcuate path between different levels through a testing station wherein the articles are acted upon by centrifugal force of a magnitude which is indicative of the weight of the respective articles; generating first signals denoting the magnitude of centrifugal force acting upon the articles being conveyed through the testing station; and converting the first signals into second signals denoting the weight of the respective articles.

2. The method of claim 1, wherein the articles are wrapped sections of rod-shaped tobacco fillers having a predetermined length.

3. The method of claim 1, wherein the articles are elongated and said path has a substantially circular portion extending through the testing station, said conveying step including advancing the articles at least substantially transversely of their length at least along said at least substantially circular portion of said path.

4. The method of claim 1, further comprising the steps of monitoring the speed at which successive articles of the series are being conveyed through the testing station and generating third signals denoting the monitored speed of articles at the testing station, said converting step including processing the first signals jointly with the respective third signals.

5. A method of determining the weight of rod-shaped articles of the tobacco processing industry, comprising the steps of conveying successive articles of a series of articles along an arcuate path through a testing station wherein the articles are acted upon by centrifugal force of a magnitude which is indicative of the weight of the respective articles, said conveying step comprising introducing the articles of said series into peripheral flutes of a conveyor rotatable about an axis which is at least substantially parallel to the flutes and rotating the conveyor in a predetermined direction to thus advance successive flutes along said path toward, through and beyond the testing station, said conveying step further comprising pneumatically holding the articles in the respective flutes during advancement toward the testing station; generating first signals denoting the magnitude of centrifugal force acting upon the articles being conveyed through the testing station, comprising interrupting the pneumatic hold upon the articles not later than at the testing station so that the articles are free to move relative to their respective flutes under the action of centrifugal force and act upon at least one sensor which initiates the generation of said first signals; and converting the first signals into second signals denoting the weight of the respective articles.

6. The method of claim 5, wherein said step of pneumatically holding includes attracting the articles into the respective flutes by suction.

7. The method of claim 5, wherein said conveying step further comprises pneumatically holding the articles in their respective flutes during advancement of articles beyond the testing station.

8. Apparatus for determining the weight of rod-shaped articles of the tobacco processing industry, comprising means for conveying successive articles of a series of articles through a testing station between different levels along a predetermined path having at the testing station an arcuate portion so that successive articles being conveyed along said arcuate portion are acted upon by centrifugal force of a magnitude which is indicative of the weight of the respective articles; means for generating first signals denoting the magnitude of centrifugal force acting upon the articles at the testing station; and means for processing said first signals into second signals denoting the weight of the respective articles.

9. The apparatus of claim 8, wherein the articles are wrapped sections of rod-shaped tobacco fillers having a predetermined length.

10. The apparatus of claim 8, wherein said arcuate portion of said path has a first radius of curvature and further comprising at least one sensor having a surface confronting successive articles being conveyed through the testing station and having a second radius of curvature at least approximating said first radius, said means for generating said first signals comprising at least one transducer cooperating with said at least one sensor to generate first signals having at least one parameter indicative of the magnitude of centrifugal force acting upon said surface of said at least one sensor, said processing means having at least one input for signals from said at least one transducer.

11. The apparatus of claim 10, wherein said at least one sensor forms part of said means for generating first signals.

12. The apparatus of claim 10, further comprising means for transmitting forces, corresponding to the centrifugal force acting upon said surface of said at least one sensor, from said at least one sensor to said at least one transducer.

13. The apparatus of claim 12, wherein said means for transmitting forces includes at least one beam which is flexible by said at least one sensor and pressure transmitting means between said at least one beam and said at least one transducer.

14. The apparatus of claim 12, wherein said means for transmitting forces includes at least one lever which is pivotable by said at least one sensor, and pressure transmitting means between said at least one lever and said at least one transducer.

15. The apparatus of claim 12, wherein said at least one transducer comprises at least one extensometer and said means for transmitting forces includes at least one beam which is flexible by said at least one sensor and acts upon said at least one extensometer.

16. The apparatus of claim 10, wherein said at least one transducer comprises at least one piezoelectric transducer.

17. The apparatus of claim 10, wherein said means for conveying has article receiving flutes for articles being conveyed toward and through the testing station, said flutes being spaced apart from each other a predetermined distance in a direction of conveying the articles toward and through the testing station, said at least one sensor having a length in said direction less than said predetermined distance.

18. The apparatus of claim 8, further comprising means for monitoring the speed at which successive articles of the series are being conveyed through the testing station and for generating third signals denoting the monitored speed of articles at said testing station, said processing means having an input for said third signals and being operative to generate said second signals as a function of the respective first and third signals.

19. The apparatus of claim 8, wherein said arcuate portion of said path has a first radius of curvature and said means for generating first signals includes at least one sensor having an arcuate surface confronting the articles being conveyed through the testing station and having a second radus of curvature smaller than said first radius.

20. Apparatus for determining the weight of rod-shaped articles of the tobacco processing industry, comprising means for conveying successive articles of a series of articles through a testing station along a predetermined path having at the testing station an arcuate portion so that successive articles being conveyed along said arcuate portion are acted upon by centrifugal force of a magnitude which is indicative of the weight of the respective articles, said means for conveying comprising a conveyor rotatable about a predetermined axis and having a peripheral surface provided with flutes which receive the articles to be weighed and advance the thus received articles along said path in response to rotation of said conveyor in a predetermined direction so that successive articles of the series are advanced in the respective flutes toward, through and beyond the testing station, said conveyor further having means for pneumatically holding articles in the respective flutes during advancement toward and beyond the testing station; means for generating first signals denoting the magnitude of centrifugal force acting upon the articles at the testing station; and means for processing said first signals into second signals denoting the weight of the respective articles.

21. The apparatus of claim 20, wherein said means for pneumatically holding includes means for attracting the articles in the respective flutes by suction save during advancement of the articles through the testing station.

22. Apparatus for determining the weight of rod-shaped articles of the tobacco processing industry, said articles having a predetermined diameter and said apparatus comprising means for conveying successive articles of a series of articles through a testing station along a predetermined path having at the testing station an arcuate portion so that successive articles being conveyed along said arcuate portion are acted upon by centrifugal force of a magnitude which is indicative of the weight of the respective articles, said arcuate portion of said path having a first radius of curvature; at least two sensors having surfaces confronting successive articles being conveyed through the testing station and having second radii of curvature at least approximating said first radius, said sensors being spaced apart from each other in a longitudinal direction of articles being conveyed through the testing station and each of said sensors comprising a rail extending along a peripheral surface of a rotary conveyor forming part of said conveying means and in a direction of conveying the articles toward and through the testing station, said conveyor having flutes for the articles and said flutes having deepmost portions spaced apart from the surfaces of said sensors a distance greater than said predetermined diameter during advancement of said flutes through the testing station; means for generating first signals denoting the magnitude of centrifugal force acting upon the articles at the testing station, comprising at least one transducer cooperating with at least one of said at least two sensors to generate first signals having at least one parameter indicative of the magnitude of centrifugal force acting upon said surface of said at least one of said at least two sensors; and means for processing said first signals into second signals denoting the weight of the respective articles, said processing means having at least one input for signals from said at least one transducer.

23. The apparatus of claim 22, wherein said means for generating first signals comprises a discrete transducer for each of said sensors, said processing means having inputs for signals from said discrete transducers and being operative to process first signals simultaneously received from said discrete transducers into second signals denoting the weight of the respective articles having been in simultaneous contact with said at least two sensors.

24. Apparatus for determining the weight of rod-shaped articles of the tobacco processing industry, said articles having a predetermined diameter and said apparatus comprising means for conveying successive articles of a series of articles through a testing station along a predetermined path having at the testing station an arcuate portion so that successive articles being conveyed along said arcuate portion are acted upon by centrifugal force of a magnitude which is indicative of the weight of the respective articles, said path further including a second portion upstream and a third portion downstream of said arcuate portion as seen in a direction of advancement of articles by said conveying means along said path; at least one guide defining said second portion of said path jointly with said conveying means, said conveying means having flutes for rod-shaped articles and said flutes having deepmost portions spaced apart from said at least one guide a distance at least matching said predetermined diameter while the flutes advance the articles along said second portion of said path, said conveying means further comprising means for pneumatically holding the articles in the respective flutes during advancement of such flutes along said second portion but short of said arcuate portion of said path; means for generating first signals denoting the magnitude of centrifugal force acting upon the articles at the testing station; and means for processing said first signals into second signals denoting the weight of the respective articles.

25. The apparatus of claim 24, wherein said at least one guide comprises a plurality of guide rails.

26. Apparatus for determining the weight of rod-shaped articles of the tobacco processing industry, said articles having a predetermined diameter and said apparatus comprising means for conveying successive articles of a series of articles through a testing station along a predetermined path having at the testing station an arcuate portion so that successive articles being conveyed along said arcuate portion are acted upon by centrifugal force of a magnitude which is indicative of the weight of the respective articles, said path further including a second portion upstream and a third portion downstream of said arcuate portion as seen in a direction of advancement of articles by said conveying means along said path; at least one guide defining said third portion of said path jointly with said conveying means, said conveying means having flutes for rod-shaped articles and said flutes having deepmost portions spaced apart from said at least one guide a distance at least matching said predetermined diameter while the flutes advance the articles along said third portion of said path, said conveyor means further comprising means for pneumatically holding the articles in the respective flutes during advancement of such flutes along at least a part of said third portion of said path; means for generating first signals denoting the magnitude of centrifugal force acting upon the articles at the testing station; and means for processing said first signals into second signals denoting the weight of the respective articles.

27. The apparatus of claim 26, wherein said at least one guide comprises a plurality of guide rails.

28. Apparatus for determining the weight of rod-shaped articles of the tobacco prcessing industry, comprising means for conveying successive articles of a series of articles through a testing station along a predetermiend path having at the testing station an arcuate portion so that successive articles being conveyed along said arcuate portion are acted upon by centrifugal force of a magnitude which is indicative of the weight of the respective articles; means for generating first signals denoting the magnitude of centrifugal force acting upon the articles at the testing station, said means for generating first signals including a plurality of sensors which are acted upon by successive articles being conveyed through said testing station; and means for processing said first signals into second signals denoting the weight of the respective articles, said mans for generating first signals further including a single transducer interposed between said plurality of sensors and said processing means.

* * * * *